United States Patent
Hyun et al.

(10) Patent No.: US 8,179,430 B2
(45) Date of Patent: May 15, 2012

(54) BIOMETRIC AUTHENTICATION DEVICE

(75) Inventors: Hae Seung Hyun, Gyunggi-do (KR);
Bae Kyun Kim, Gyunggi-do (KR); Il Kweon Joung, Gyunggi-do (KR); Il Hyung Jung, Seoul (KR); Kyungno Lee, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 378 days.

(21) Appl. No.: 12/609,378

(22) Filed: Oct. 30, 2009

(65) Prior Publication Data

US 2011/0063430 A1 Mar. 17, 2011

(30) Foreign Application Priority Data

Sep. 11, 2009 (KR) .................. 10-2009-0085956

(51) Int. Cl.
*H04N 5/253* (2006.01)
*G06F 7/04* (2006.01)
*G06K 9/00* (2006.01)
*H04N 5/243* (2006.01)

(52) U.S. Cl. .............. 348/77; 340/5.83; 382/126

(58) Field of Classification Search .............. None
See application file for complete search history.

(56) References Cited

U.S. PATENT DOCUMENTS

| | | | | |
|---|---|---|---|---|
| 6,912,299 | B1 * | 6/2005 | Hoshino | 382/124 |
| 7,561,257 | B2 * | 7/2009 | Nagasaka et al. | 356/71 |
| 2007/0036399 | A1 * | 2/2007 | Matsumura et al. | 382/124 |
| 2008/0152195 | A1 * | 6/2008 | Nagasaka et al. | 382/115 |
| 2009/0092291 | A1 * | 4/2009 | Nagasaka et al. | 382/115 |
| 2009/0110249 | A1 * | 4/2009 | Miura et al. | 382/124 |

* cited by examiner

*Primary Examiner* — John B. Walsh
(74) *Attorney, Agent, or Firm* — Blakely Sokoloff Taylor & Zafman LLP

(57) ABSTRACT

Disclosed herein is a biometric authentication device. The biometric authentication device according to the present invention is configured such that it blocks visible light using an authentication button, the inside of which is opened or closed by a finger so as to realize the small size and slim shape of a biometric authentication device, and blocks infrared light or allows infrared light to pass while a driving unit moves vertically or horizontally by the operation of the authentication button. Accordingly, in the biometric authentication device, a camera module captures a normal image in normal mode, and captures an infrared pattern reflected from a finger in a vein authentication mode to perform biometric authentication.

4 Claims, 3 Drawing Sheets

BIOMETRIC AUTHENTICATION DEVICE

CROSS REFERENCE TO RELATED APPLICATION

This application claims the benefit of Korean Patent Application No. 10-2009-0085956, filed on Sep. 11, 2009, entitled "Biometric Authentication Device", which is hereby incorporated by reference in its entirety into this application.

BACKGROUND OF THE INVENTION

1. Technical Field

The present invention relates to a biometric authentication device, which performs biometric authentication by capturing the shadow of a vein.

2. Description of the Related Art

Generally, biometric recognition is a method of verifying the identity of an individual using his or her peculiar physical characteristics or habits. Biometric recognition as such has been applied to and used in various fields, for example, the field of security.

That is, biometric recognition has been widely used to perform personal identification in a variety of environments ranging from a physical environment related to identifying an individual to manage admissions or use cash dispensers, to a cyber environment related to identifying an individual for electronic commerce based on the Internet or telebanking.

Personal identification based on such biometric recognition has various advantages compared to identification based on a password or an ID card, the most remarkable of which being that biometric recognition is used for authentication accompanied by the presence of an individual.

There is a concern that, in the case of identification based on a password or an ID card, these may be lent out or lost and be then misappropriated. However, identification based on biometric recognition is advantageous in that an individual is authenticated only when the individual is present, thus improving the reliability of verifying the identities of individuals.

Furthermore, identification based on biometric recognition is superior in terms of the convenience to identification based on a password or an ID card. The reason for this is that an individual does not need to be in personal possession of the ID card nor have to memorize a password.

Meanwhile, methods of biometric recognition are classified into a method using physical characteristics, such as the face, the iris, the retina, voice, fingerprints and veins, and a method using physical habits such as a signature and a writing style.

Among the methods, vein recognition is a biometric recognition technique which uses the patterns of veins inside a human body and is devised in light of the fact that the pattern of veins is different between persons.

Vein authentication based on such vein recognition is implemented using a principle in which infrared light having a wavelength of 700 to 1000 nm can easily pass through a large part of body tissue, but can be easily absorbed by the hemoglobin of red blood cells flowing in the veins.

That is, when an image of a finger is captured using an infrared camera module and is then observed, veins appear as a shadow. Vein authentication is a scheme for identifying each individual using the characteristics of veins, and enables identification regardless of the states of the surface of the finger, such as the state of dryness, thus decreasing the erroneous recognition rate compared to authentication using fingerprints, and making it impossible to forge venous images unlike fingerprints.

However, such a conventional biometric authentication device is accompanied by a large cost burden because an expensive infrared camera module must be used to capture an image of the finger.

In the case of a typical camera module, a lens-shaped infrared cut-off filter or an infrared cut-off film is fundamentally included in an optical system. Since both a Complementary Metal-Oxide-Semiconductor (CMOS) sensor and a Charge Coupled Device (CCD) sensor can detect infrared light, infrared light in natural acts as noise when an image is captured.

Therefore, a typical camera module includes as a basic part thereof an infrared cut-off filter. In a typical camera module for mobile devices, the surface of a lens is coated with a material in which $SiO_2$ and $TiO_2$ are mixed with each other at a ratio of about 5:5 using an IR-coating method. Accordingly, a typical camera module is inappropriate for a biometric authentication device which performs vein authentication by capturing an image using infrared light.

Due thereto, an infrared camera module must be used, but a burden on the manufacturing cost of an authentication device greatly increases because the infrared camera module is expensive.

In order to solve this problem, a conventional biometric authentication device uses a camera module having no infrared blocking function, but further includes an infrared blocking filter and a visible light blocking filter so as to perform both normal imaging and infrared imaging, and then performs normal imaging and infrared imaging for vein authentication in such a way as to alternately switch the filters.

However, such a filter switching-type conventional biometric authentication device is problematic in that, since an internal space, used to individually install the infrared blocking filter and the visible light blocking filter, is required, it is difficult to realize the small size and slim shape of the entire construction.

Furthermore, such a filter switching-type conventional authentication device is considerably inconvenient to use because the infrared blocking filter and the visible light blocking filter block infrared light and visible light, respectively, using a filter switching method. Due to this inconvenience, an automatic scheme is proposed, but this is disadvantageous in that a driving device must be separately installed, thus making it more difficult to realize the small size and slim shape of a device.

SUMMARY OF THE INVENTION

Accordingly, the present invention has been made to construct a biometric authentication device so that, in order to enable both typical imaging and infrared imaging when a camera module having no infrared blocking function is used as an imaging device performing vein authentication, only an infrared blocking filter is included, and parts of the biometric authentication devices are divided into an infrared blocking filter presence part and an infrared blocking filter non-presence part, and to overcome the difficulty of realizing a small size and a slim shape occurring when those parts are used through a filter switching method, and thus the present invention is intended to provide a biometric authentication device, which performs normal imaging and infrared imaging for vein authentication while selectively blocking infrared light and visible light using a filter switching method.

In accordance with an aspect of the present invention, there is provided a biometric authentication device, comprising an authentication button installed to be vertically movable in such a way that a finger rest part enabling a finger to be placed thereon is formed on an upper portion of the authentication button and an internal passage opened or closed by the finger is formed inside the authentication button; a driving unit including an upper driving unit arranged below the authentication button and configured to be vertically movable, and a lower driving unit diagonally coupled to a bottom of the upper driving unit and configured to be horizontally movable, the driving unit having an upper light transmission passage and a lower light transmission passage, which communicate with the internal passage, to be formed therein; an infrared blocking filter installed in the lower driving unit to divide the lower light transmission passage into an infrared pass region and an infrared blocking region; an elastic element configured to restore the lower driving unit, which has moved horizontally, to an original position thereof using a sensor installed on the lower driving unit and a restoring force; a light source for radiating infrared light onto the finger in response to a signal output from the sensor; and a camera module for capturing an image of the finger.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
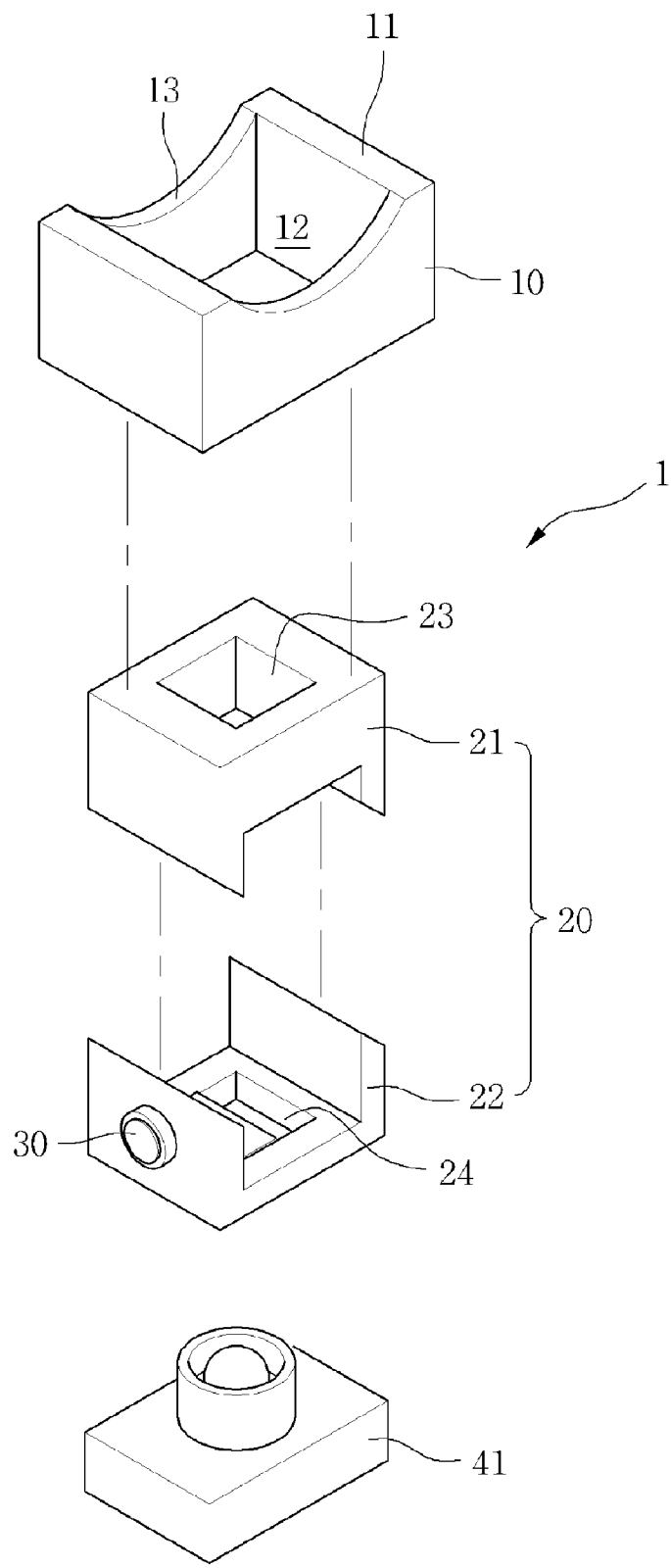
FIG. 1 is an exploded perspective view showing a biometric authentication device according to the present invention.

FIG. 1 is an exploded perspective view showing a biometric authentication device according to the present invention. In FIG. 1, the biometric authentication device is disassembled into an authentication button, a driving unit, and a camera module, and examples thereof are illustrated.

Figure 2:
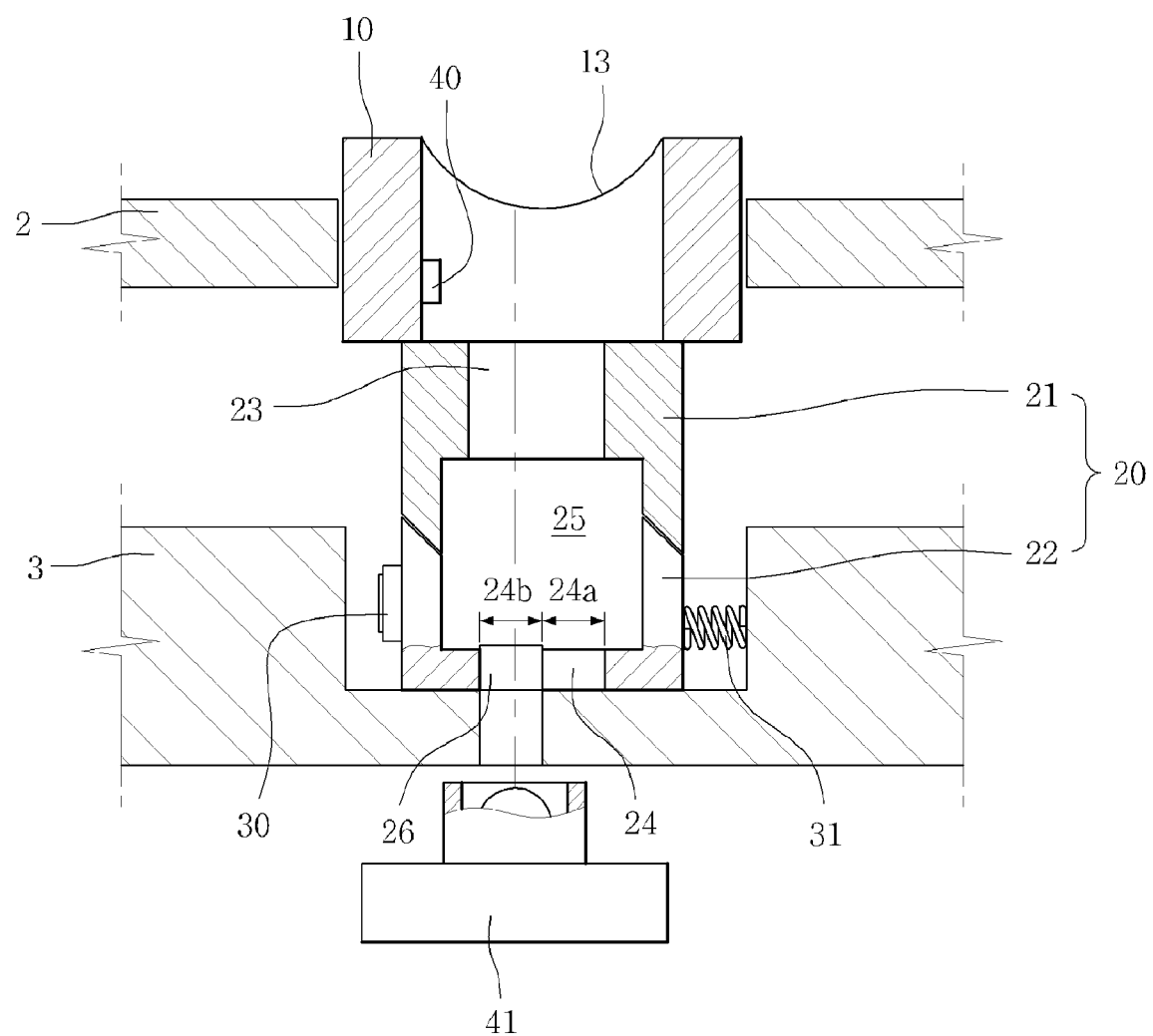
FIG. 2 is a sectional view showing the assembly of a biometric authentication device according to the present invention.

FIG. 2 is a sectional view showing the assembly of the biometric authentication device according to the present invention. FIG. 2 shows that an infrared blocking filter is to disposed on the camera module.

Figure 3:
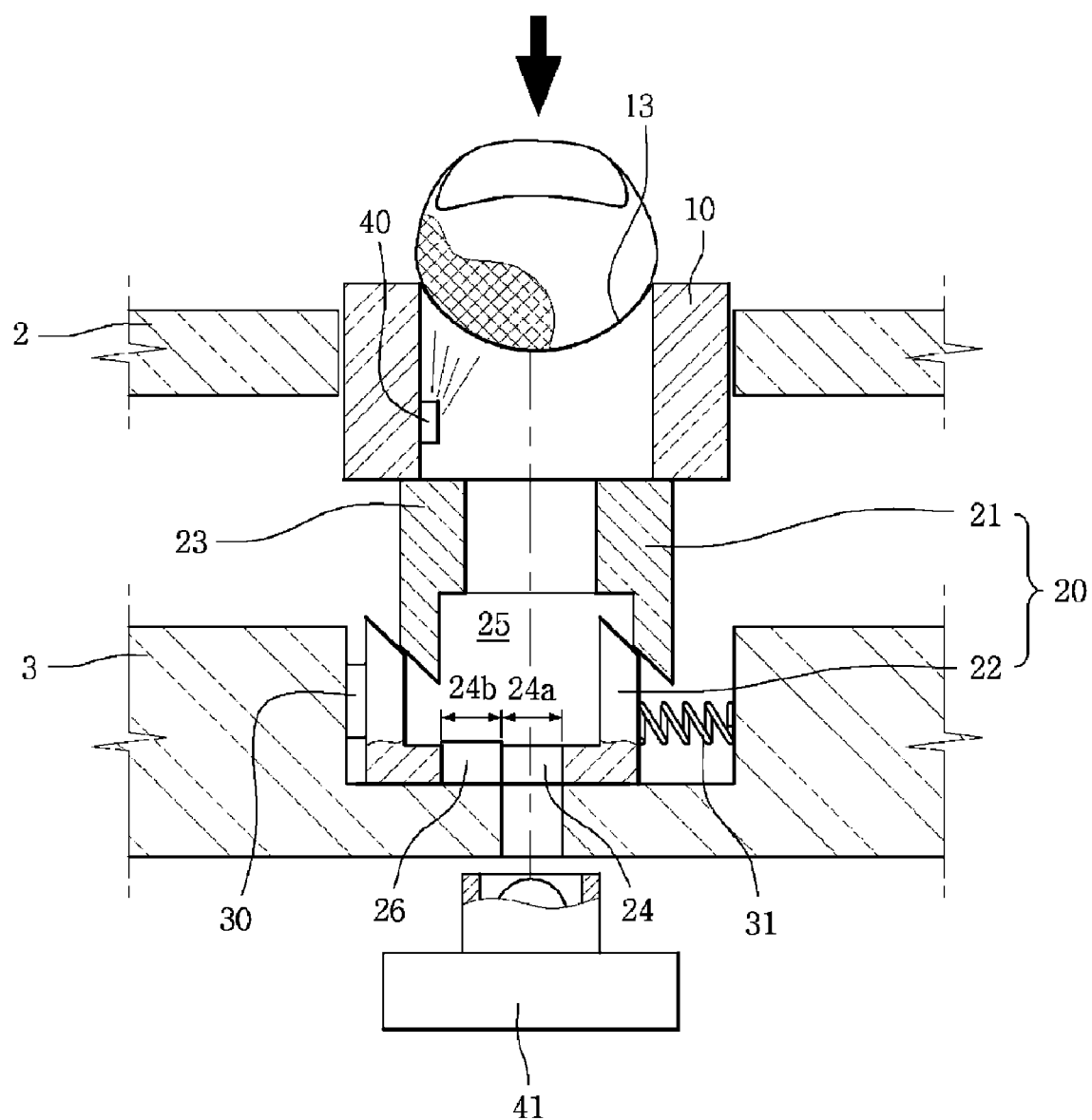
FIG. 3 is a sectional view showing the driving of the biometric authentication device according to the present invention.

FIG. 3 is a sectional view showing the driving of the biometric authentication device according to the present invention. FIG. 3 shows that, by the downward movement of the authentication button, an upper driving unit moves vertically, and a lower driving unit moves horizontally, so that an infrared pass region is placed on the camera module.

That is, the present invention has basic characteristics of including, in technical construction, an authentication button 10, a driving unit 20, an infrared blocking filter 26, a sensor 30, an elastic element 31, a light source 40 for radiating infrared light onto a finger, and a camera module 41 for capturing an image of the finger, in order to perform vein authentication using a filter switching method.

The authentication button 10 corresponds to the switch of a biometric authentication device 1. As shown in FIGS. 1 and 2, a finger rest part 11 enabling a finger to be placed thereon is formed on the upper portion of the authentication button 10, and an internal passage 12 is formed in the biometric authentication device 1, thus enabling the authentication button 10 to move vertically.

That is, the authentication button 10 is installed in the external structure 2 of a product in which the biometric authentication device 1 is installed, and functions to prohibit external visible light from being radiated into the internal passage 12 when the finger is placed on the finger rest part 11 in a vein authentication imaging mode.

Preferably, a guide part 13 having a shape identical or extremely similar to that of the lower portion of the finger is formed on the finger rest part 11 in a rounded shape to enable the finger to be stably placed thereon. Thanks to the guide part 13, visible light can be more effectively blocked, and thus the accuracy of vein authentication is improved.

Such an authentication button 10 is shown to be formed in an approximately hexahedral shape, but this is only an example and it may be formed in various shapes including a hexahedron. This example is only a selective item varying according to the to type of product in which the biometric authentication device 1 is installed.

In this case, the product in which the biometric authentication device 1 including the authentication button 10 is installed may be a mobile device by way of example. Accordingly, the external structure 2 in which the authentication button 10 is installed is the external case of the mobile device. An internal structure 3 which will be described later is the internal case of the mobile device.

As shown in FIGS. 2 and 3, the driving unit 20 included in the present invention is connected to the authentication button 10, and is operated by finger pressure. That is, the driving unit 20 includes an upper driving unit 21 which moves vertically, and a lower driving unit 22 which moves horizontally as the upper driving unit 21 moves vertically. In this case, a structure integrated with or separated from the authentication button 10 is selectively applied to the upper driving unit 21 depending on the circumstances.

The lower driving unit 22 is diagonally coupled to the upper driving unit 21, and moves horizontally as the upper driving unit 21 moves vertically. Most preferably, mutual coupling is realized such that a diagonal line makes an angle of 45°.

The drawings show that an upper light transmission passage 23 and a lower light transmission passage 24 which communicate with the internal passage 12 are respectively formed in the upper driving unit 21 and the lower driving unit 22.

Therefore, when the authentication button 10 moves downwards under the pressure of a finger placed on the finger rest part 11, the upper driving unit 21 moves vertically in the same direction as that of the authentication button 10, and the lower driving unit 22, diagonally coupled to the upper driving unit 21, moves horizontally while being caused to slide because of vertical pressure.

In this way, in the driving unit 20 including the vertically moving upper driving unit 21 and the horizontally moving lower driving unit 22, a cutout space 25 is formed in cooperation with the upper driving unit 21 and the lower driving unit 22. Such a cutout space 25 is formed to communicate with both the upper light transmission passage 23 and the lower light transmission passage 24.

The cutout space 25 contributes to the reduction in the entire weight of the biometric authentication device 1 by enabling the weight of the driving unit 20 to be light, and also contributes to the reduction in the quantity of material required to manufacture the driving unit 20.

The infrared blocking filter 26 included in the present invention is installed in the lower driving unit 22 to enable the lower light transmission passage 24 formed in the lower driving unit to be divided into an infrared pass region 24a and an infrared blocking region 24b. In the present embodiment, a well-known Infrared (IR) cut-off filter is employed as the infrared blocking filter 26.

In this way, the infrared blocking filter 26 is installed in the lower driving unit 22 to enable the lower light transmission passage 24 to be divided into the infrared pass region 24a and the infrared blocking region 24b. Accordingly, in normal mode, the infrared blocking region 24b is placed on the camera module 41, and thus the camera module 41 performs normal imaging while infrared light is blocked. In contrast, in vein authentication imaging mode, as the lower driving unit 22 moves horizontally, the infrared pass region 24a is placed on the camera module 40, and thus the camera module performs infrared imaging.

The sensor 30 included in the present invention comes into contact with an adjacent internal structure 3 when the lower driving unit 22 moves horizontally, and then transmits signals prompting the light source 40, which radiates infrared light, to start operation and the camera module 41, which captures an image, to start imaging.

The sensor 30 may be of a pressure-sensitive type or a contact type.

That is, the pressure-sensitive or contact sensor 30 is installed on the side surface of the lower driving unit 22 which moves horizontally under the pressure of the finger. Accordingly, as the sensor 30 comes into contact with the adjacent internal structure 3 when the lower driving unit 22 moves horizontally, the sensor 30 transmits signals required to operate the light source 40 and the camera module 41.

The present invention includes the elastic element 31 installed opposite the sensor 30 and configured to restore the lower driving unit 22, which has moved horizontally, to its original position using a restoring force. In the present embodiment, the elastic element 31 is implemented as a typical elastic coil spring by way of example.

As one end of the elastic element 31 is fastened to the lower driving unit 22 and the other end thereof is fastened to the adjacent internal structure 3, the elastic element 31 is operated such that, when the lower driving unit 22 moves horizontally, the elastic element 31 is expanded, whereas when the pressure of the finger is released, the elastic element 31 restores the lower driving unit 22 to the original position using its own restoring force.

The light source 40 is configured to radiate infrared light onto the finger in response to a signal output from the sensor 30. In the present embodiment, as an example of the light source 40, a typical infrared lamp or, more preferably, an infrared Light Emitting Diode (LED), is installed in the internal passage 12 of the authentication button 10.

Since the infrared LED can acquire a maximum quantity of light using a minimum of power, it is very suitable as the light source 40 of the present invention.

The camera module 41 included in the present invention is a component excluding an infrared blocking function, and is arranged below the driving unit 20 and configured to start imaging in response to a signal output from the sensor 30.

Next, the operation of the biometric authentication device according to the present invention will be described in detail below.

First, in normal imaging mode for normal imaging, the camera module 41 captures an image via a path sequentially leading to the infrared blocking region 24b, the upper light transmission passage 23 and the internal passage 12.

That is, the infrared blocking region 24b, in which the infrared blocking filter 26 is installed, is placed on the camera module 41, and is configured to block infrared light from the nature, so that the camera module 41 can capture a noise-free image.

Next, in vein authentication imaging mode for vein authentication, when the finger is placed on the finger rest part 11 formed on the upper portion of the authentication button 10, the finger closes up the internal passage 12, thus blocking visible light. In this case, when the guide part 13 is formed on the finger rest part 11, close contact with the finger is ensured, thus enabling visible light to be more effectively blocked.

In this state, when a force is applied to the finger and the finger presses the authentication button 10, the upper driving unit 21 moves vertically in a downward direction, and then presses the lower driving unit 22. As a result, the lower driving unit 22 moves horizontally, so that the infrared pass region 24a is placed on the camera module 41.

Therefore, when the sensor 30 collides with and comes into contact with the adjacent internal structure 3 by the horizontal movement of the lower driving unit 22, the light source 40 radiates infrared light onto the finger, and the camera module 41 captures an image of the finger through the infrared pass region 24a.

The image captured by the camera module 41 is transmitted to an image sensor (not shown) typically installed in the mobile device, and only information about a venous pattern for vein authentication is extracted from the image by the image sensor.

Meanwhile, when vein authentication is completed and the force of the finger is released, the lower driving unit 22 is restored to its original position by the restoring force of the elastic element 31. As a result, the upper driving unit 21 moves vertically in an upward direction, and then the authentication button 10 is restored to its original position by the vertical movement of the upper driving unit 21.

According to the construction of the present invention, there is an advantage in that a biometric authentication device includes an authentication button to block visible light using a finger, and includes driving units, which are vertically and horizontally movable, to block infrared light using a filter switching method, so that the small size and slim shape of a biometric authentication device can be realized, and thus the biometric authentication device can be easily applied to portable devices such as mobile devices.

In particular, the present invention is advantageous in that close contact with the finger is ensured using a guide part formed in an authentication button, so that visible light is more effectively blocked, thus improving the accuracy of vein authentication.

Furthermore, the present invention is advantageous in that a cutout space is formed in driving units, so that a light weight can be realized, and the entire weight of the biometric authentication device can be reduced, and thus the biometric authentication device is suitable for portable devices such as mobile devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A biometric authentication device, comprising:

an authentication button installed to be vertically movable in such a way that a finger rest part enabling a finger to be placed thereon is formed on an upper portion of the authentication button and an internal passage opened or closed by the finger is formed inside the authentication button;

a driving unit including an upper driving unit arranged below the authentication button and configured to be vertically movable, and a lower driving unit diagonally coupled to a bottom of the upper driving unit and configured to be horizontally movable, the driving unit having an upper light transmission passage and a lower light transmission passage, which communicate with the internal passage, to be formed therein;

an infrared blocking filter installed in the lower driving unit to divide the lower light transmission passage into an infrared pass region and an infrared blocking region;

an elastic element configured to restore the lower driving unit, which has moved horizontally, to an original position thereof using a sensor installed on the lower driving unit and a restoring force;

a light source for radiating infrared light onto the finger in response to a signal output from the sensor; and a camera module for capturing an image of the finger.

2. The biometric authentication device as set forth in claim 1, wherein the authentication button comprises a guide part formed in a rounded shape.

3. The biometric authentication device as set forth in claim 1, wherein the driving unit comprises a cutout space formed in cooperation with the upper driving unit and the lower driving unit and configured to communicate with both the upper light transmission passage and the lower light transmission passage.

4. The biometric authentication device as set forth in claim 1, wherein the light source is an infrared Light Emitting Diode (LED).

* * * * *